US011956594B2

(12) United States Patent
Kudekar et al.

(10) Patent No.: US 11,956,594 B2
(45) **Date of Patent: *Apr. 9, 2024**

(54) TWO-WAY INTEGRATED SPEAKER WITH PIEZOELECTRIC DIAPHRAGM AS TWEETER

(71) Applicant: Apple Inc., Cupertino, CA (US)

(72) Inventors: Aneesh R. Kudekar, Campbell, CA (US); Onur I. Ilkorur, Campbell, CA (US); Pablo Seoane Vieites, San Jose, CA (US); Stuart M. Nevill, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,838

(22) Filed: Feb. 14, 2023

(65) Prior Publication Data

US 2023/0199404 A1 Jun. 22, 2023

Related U.S. Application Data

(63) Continuation of application No. 17/460,139, filed on Aug. 27, 2021, now Pat. No. 11,627,416.

(51) Int. Cl.

*H04R 25/00* (2006.01)
*H04R 17/00* (2006.01)

(52) U.S. Cl.

CPC .................................. *H04R 17/00* (2013.01)

(58) Field of Classification Search

CPC ........ H04R 1/026; H04R 1/023; H04R 1/025; H04R 1/345; H04R 1/32; H04R 2400/11; H04R 2201/25

See application file for complete search history.

(56) References Cited

U.S. PATENT DOCUMENTS

| | | | | |
|---|---|---|---|---|
| 4,554,414 | A | 11/1985 | House | |
| 5,193,119 | A * | 3/1993 | Tontini .................... | H04R 1/24 381/190 |
| 5,295,195 | A | 3/1994 | Mitobe et al. | |
| 8,467,564 | B2 | 6/2013 | Liu | |
| 11,627,416 | B2 * | 4/2023 | Kudekar ................. | H04R 1/24 381/190 |

FOREIGN PATENT DOCUMENTS

| | | |
|---|---|---|
| CA | 1287394 | 8/1991 |
| CN | 204046806 | 12/2014 |

* cited by examiner

*Primary Examiner* — Amir H Etesam
(74) *Attorney, Agent, or Firm* — BAKERHOSTETLER

(57) ABSTRACT

Aspects of the subject technology relate to a device comprising a moving-coil speaker including a diaphragm to play low-frequency signals from an audio-signal source, and a piezoelectric transducer coupled to the diaphragm to play high-frequency signals from the audio-signal source. A coupler couples the diaphragm to a housing of the device.

20 Claims, 5 Drawing Sheets

TWO-WAY INTEGRATED SPEAKER WITH PIEZOELECTRIC DIAPHRAGM AS TWEETER

CROSS REFERENCE TO RELATED APPLICATIONS

This application is a continuation of U.S. patent application Ser. No. 17/460,139, entitled "TWO-WAY INTEGRATED SPEAKER WITH PIEZOELECTRIC DIAPHRAGM AS TWEETER," filed on Aug. 27, 2021, the entirety of which is incorporated herein in its entirety.

TECHNICAL FIELD

The present description relates generally to audio systems including a two-way integrated system having a moving-coil micro-speaker woofer with a lead-free piezoelectric diaphragm as a tweeter.

BACKGROUND

In sound systems, woofers are speakers designed to play the bass (low-frequency) signals and may not be efficient in playing high-frequency (treble) signals. Woofers generally have a lower resonance frequency and run into voltage headroom and can generate a lot of heat if used to play high-frequency signals due to their heavier moving mass and higher inductance from the coil. Additionally, woofers can degrade the audio fidelity if used to play the full audio bandwidth. Conventional tweeters are also moving-coil speakers designed to be efficient at playing high-frequency signals. Tweeters have higher resonance frequency and are relatively leaner. Thus, a combination of woofer and tweeter is used to cover the entire audio bandwidth for preserving the fidelity.

Some electronic devices incorporate such two-way audio systems, for example, by using four moving-coil woofers and four moving-coil tweeters as separate modules, with a crossover frequency of approximately 2.5 KHz or lower. Two-way audio systems utilize two different modules (one woofer and one tweeter). This is becoming increasingly challenging as electronic devices become heavily constrained in space requirements and module costs.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block-diagram form in order to avoid obscuring the concepts of the subject technology.

The subject disclosure is directed to a two-way integrated system including a moving-coil micro-speaker woofer with a lead-free piezoelectric diaphragm as a tweeter. The subject technology combines a moving-coil woofer and a piezoelectric tweeter into a single stand-alone module, which saves space while maintaining the audio performance and fidelity. The moving-coil woofer generates low-frequency sound waves and the piezoelectric tweeter generates high-frequency sounds. The stand-alone device of the subject technology exploits piezoelectricity generated by the application of an electric field to create strain in piezoelectric materials. The piezoelectric tweeter can be very thin (e.g., with a thickness within a range of about 50-150 μm) and have high-resonance frequencies with relatively less displacement than traditional moving coil speakers and hence are a good fit for high-frequency application. Further, the piezoelectric tweeters can dissipate almost no heat as they are capacitive loads and do not have traditional voice coil in a magnet assembly. This can be an advantageous feature as a number of electronic devices such as smart phones, tablets and laptops are thermally limited due to heat generated by the conventional coil in the speakers.

Figure 1:
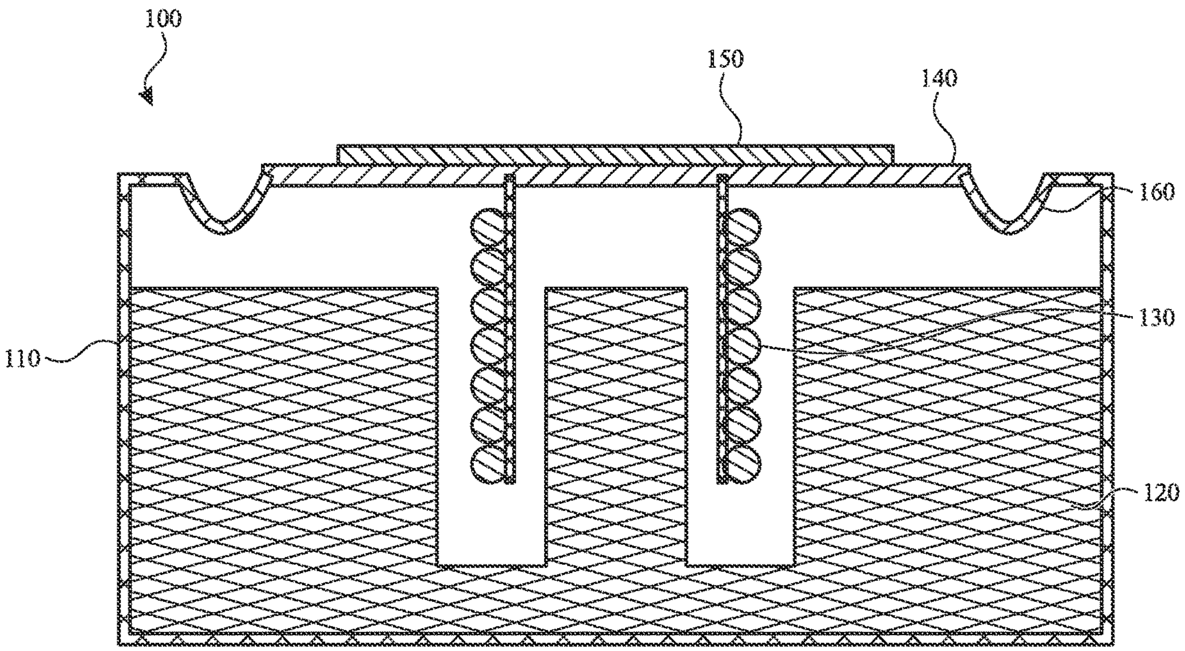
FIG. 1 illustrates a cross-sectional view of an example of a two-way integrated speaker module, in accordance with various aspects of the subject technology.

FIG. 1 illustrates a cross-sectional view of an example of a two-way integrated speaker module 100, in accordance with various aspects of the subject technology. The two-way integrated speaker module 100 (hereinafter, speaker module 100) includes a housing 110, a magnet 120, a voice coil 130, a diaphragm 140, and a piezoelectric transducer 150. The voice coil 130 is a conventional moving coil that can generate low-frequency (e.g., bass) sounds by causing-up-down motion of the diaphragm 140. The high frequency sounds are created as a result of radial motion (e.g., expansion or contraction) of the piezoelectric transducer 150, which is bonded to the diaphragm 140 with a suitable adhesive. In some implementations, the piezoelectric transducer 150 is a thin ceramic (or other material) disk with a thickness within a range of about 80-120 μm and is bonded to or formed on the diaphragm 140. In one or more implementations, the high-frequency audio signals are separated by a high-pass filter and provided to the piezoelectric transducer 150 along with a suitable biasing voltage via conductive tracings. In some implementation, the piezoelectric transducer 150 may be driven using a different voltage than the diaphragm 140.

In some implementations, the diaphragm 140 is made of a metal such as aluminum or a similar metal and is coupled to the housing 110 via a coupler (surround) 160, which can be made of a flexible material. The voice coil 130 is placed in a cylindrical cavity shell within the magnet 120, which is made of a ferromagnetic material. The voice coil 130 can receive low-frequency audio signals from an audio source through a low-pass filter. In some implementations, the piezoelectric transducer 150 can be poled in the thickness direction of the diaphragm 140, which creates radial strain on the top or bottom of the diaphragm 140. The piezoelectric transducer 150 can receive high-frequency audio signals from the audio source through a high-pass filter via conductive tracers that can be formed on the diaphragm 140. As mentioned above, in the speaker module 100, the bass-frequency and high-frequency sound waves can be created by the up-down motion of the diaphragm 140 and the radial motion of the piezoelectric transducer 150, respectively. The radial motion of the piezoelectric transducer 150 is in a direction perpendicular to the direction of the up-down motion of the diaphragm 140 and can cause flexing and/or buckling of the diaphragm itself, thus creating sound pressure at high frequencies. Bonding the piezoelectric transducer 150 to the diaphragm 140 can also help with rigidity and stiffness of the diaphragm 140. The adhesion of the diaphragm 140 to the coupler 160 can be carefully implemented to further dampen the resonant structural modes of the diaphragm 140.

Figure 2A:
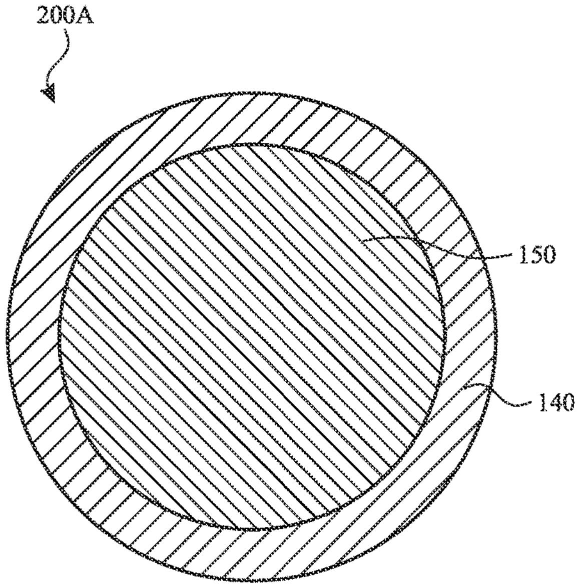
FIGS. 2A and 2B illustrate a top view and a cross-sectional view respectively of the two-way integrated speaker system module of FIG. 1, in accordance with various aspects of the subject technology.
Figure 2B:
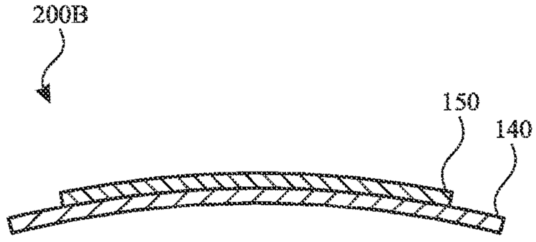

FIGS. 2A and 2B illustrate a top view 200A and a cross-sectional view 200B of the two-way integrated speaker system module 100 of FIG. 1, in accordance with various aspects of the subject technology. The top view 200A shows piezoelectric transducer 150 bonded to the diaphragm 140. In the example implementation depicted in the top view 200A, the piezoelectric transducer 150 has a circular shape, but the shape is not limited to circular and can follow the shape of the diaphragm 140. In some implementations, the area of the piezoelectric transducer 150 is about, but not limited to, 70 percent to 90 percent of the area of the diaphragm 140. In one or more implementations, the piezoelectric transducer 150 can be a piezoelectric ceramic disk, for example, made of a thin film (e.g., within a range of about 50-150 μm) of lead-zirconium-titanium oxide (PZT).

The cross-sectional view 200B shows the diaphragm 140 having a convex shape to facilitate vibrations of the diaphragm 140. The piezoelectric transducer 150 conforms to the convex shape of the diaphragm 140 to form a durable bonding. In some implementations, the amount of curvature of the diaphragm 140 is not limited to the shown curvature and can be less or greater depending on the metal used.

Figure 3A:
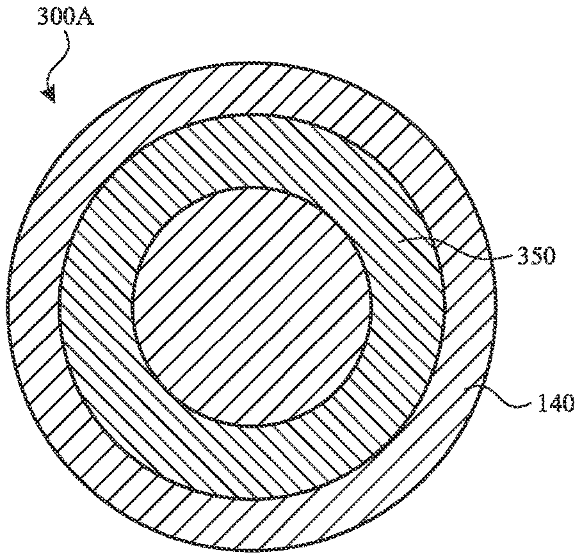
FIGS. 3A and 3B illustrate a top view and a cross-sectional view respectively of a two-way integrated speaker system module, in accordance with various aspects of the subject technology.
Figure 3B:
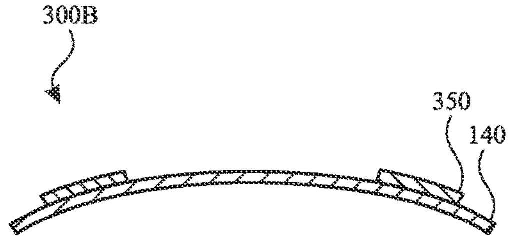

FIGS. 3A and 3B illustrate a top view 300A and a cross-sectional view 300B, respectively, of a two-way integrated speaker system module, in accordance with various aspects of the subject technology. The top view 300A shows a piezoelectric transducer 350 bonded to the diaphragm 140. In the example implementation depicted in the top view 300A, the piezoelectric transducer 350 is a ring with a circular shape, but the shape is not limited to circular and can follow the shape of the diaphragm 140. In some implementations, the area of the piezoelectric transducer 350 is about, but not limited to, 10 percent to 20 percent of the area of the diaphragm 140, which can make it less efficient as compared to the piezoelectric transducer 150 of FIG. 2. However, an advantageous feature of the piezoelectric transducer 350 is that it can reduce interference. In one or more implementations, the piezoelectric transducer 350 can be a piezoelectric ceramic, for example, made of a thin film (e.g., 100 μm) of PZT. In some implementations, the high-frequency audio signals are separated by a high-pass filter and provided to the piezoelectric transducer 350 along with a suitable biasing voltage via conductive tracings.

The cross-sectional view 300B shows the diaphragm 140 having a convex shape, and the piezoelectric transducer 350 conforms to the convex shape of the diaphragm 140 to form a durable bonding. In some implementations, the amount of curvature of the diaphragm 140 is not limited to the shown curvature and can be smaller or greater depending on the metal used to make the diaphragm 140.

Figure 4:
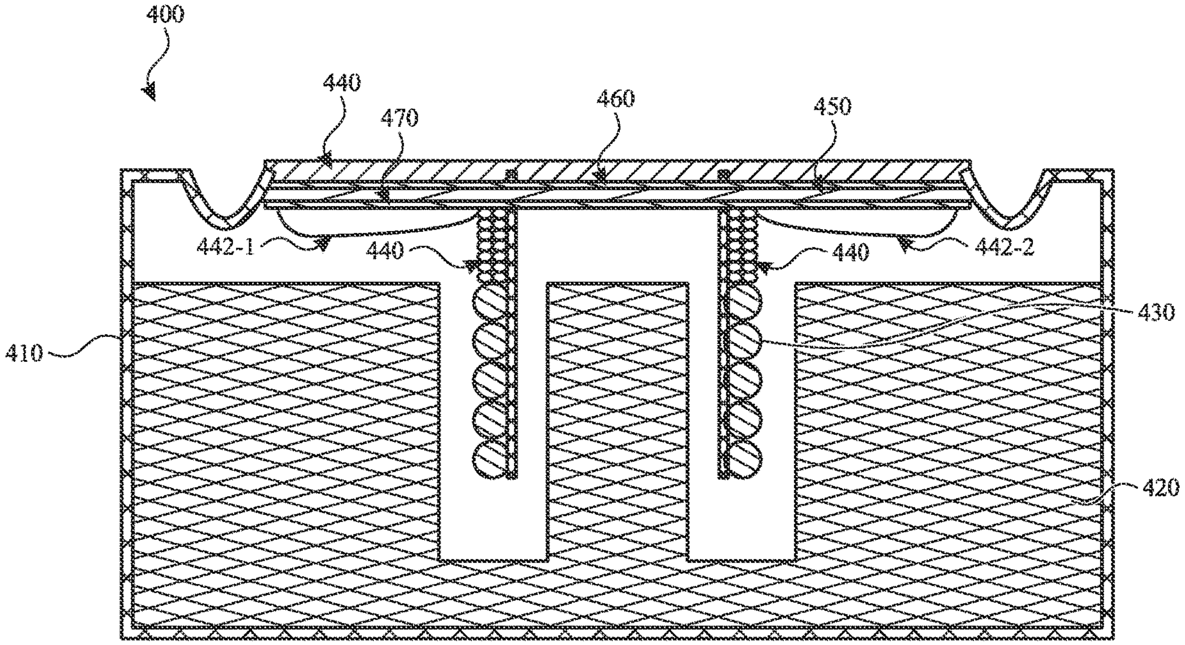
FIG. 4 illustrates a cross-sectional view of an example of a two-way integrated speaker module with a secondary coil, in accordance with various aspects of the subject technology.

FIG. 4 illustrates a cross-sectional view of an example of a two-way integrated speaker module 400 with a secondary coil, in accordance with various aspects of the subject technology. The two-way integrated speaker module 400 has one or more of the features of the two-way integrated speaker module 100, such as a housing 410, a magnet 420, a primary coil 430, a diaphragm 440 and a piezoelectric transducer 450, which are similar to the housing 110, the magnet 120, the voice coil 130, the diaphragm 140 and the piezoelectric transducer 150, respectively, as discussed above with respect to FIG. 1.

The additional features of the two-way integrated speaker module 400 include a secondary coil 432, a substrate layer 460 and a plating layer 470, which sandwich the piezoelectric transducer 450 and are connected to the two terminals 442-1 and 442-2 of the secondary coil 432, respectively. The substrate layer 460 and the plating layer 470 can be made of electrically conducting materials such as metal, for example, copper, silver, aluminum, tungsten or other suitable electrically conducting materials.

The secondary coil 432 may not be connected to any external voltage or current source and may not have any electrical connection to the primary coil 430. The secondary coil 432 is magnetically excited through a magnetic coupling to the magnetic field generated by the primary coil 430. The voltage generated at terminals 442-1 and 442-2 due to the magnetic coupling is applied to the piezoelectric transducer 450 via the substrate layer 460 and the plating layer 470, respectively. The primary coil 430 provides the broadband actuation of the piezoelectric transducer 450 as a piston. The secondary coil 432 excites the piezoelectric transducer 450 directly and at a higher voltage.

Figure 5:
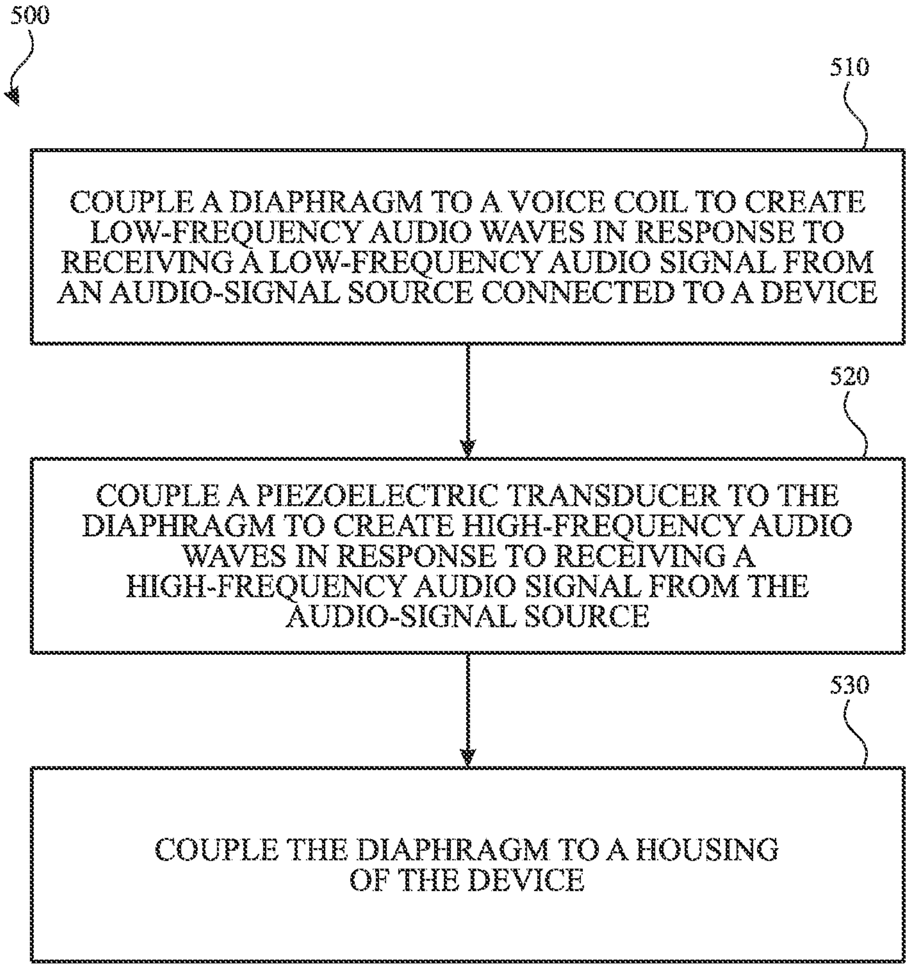
FIG. 5 illustrates a flow diagram of an example process of manufacturing a two-way integrated-speaker system module, in accordance with various aspects of the subject technology.

FIG. 5 illustrates a flow diagram of an example process 500 of manufacturing a two-way integrated-speaker system module, in accordance with various aspects of the subject technology. For explanatory purposes, the process 500 is primarily described herein with reference to the speaker module 100 of FIG. 1. However, the process 500 is not limited to the speaker module 100 of FIG. 1, and one or more blocks (or operations) of the process 500 may be performed by one or more other components of other suitable devices such as earbuds, headphones, headsets, and the like. Further, for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 begins when a diaphragm (e.g., 140 of FIG. 1) is coupled to a voice coil (e.g., 130 of FIG. 1) to create low-frequency audio waves in response to receiving a low-frequency audio signal from an audio-signal source (e.g., 660 of FIG. 6) connected to a device (e.g., 100 of FIG. 1) (510). A piezoelectric transducer (e.g., 150 of FIG. 1) is coupled to the diaphragm to create high-frequency audio waves in response to receiving a high-frequency audio signal from the audio-signal source (520). The diaphragm is coupled to a housing (e.g., 110 of FIG. 1) of the device (530).

Figure 6:
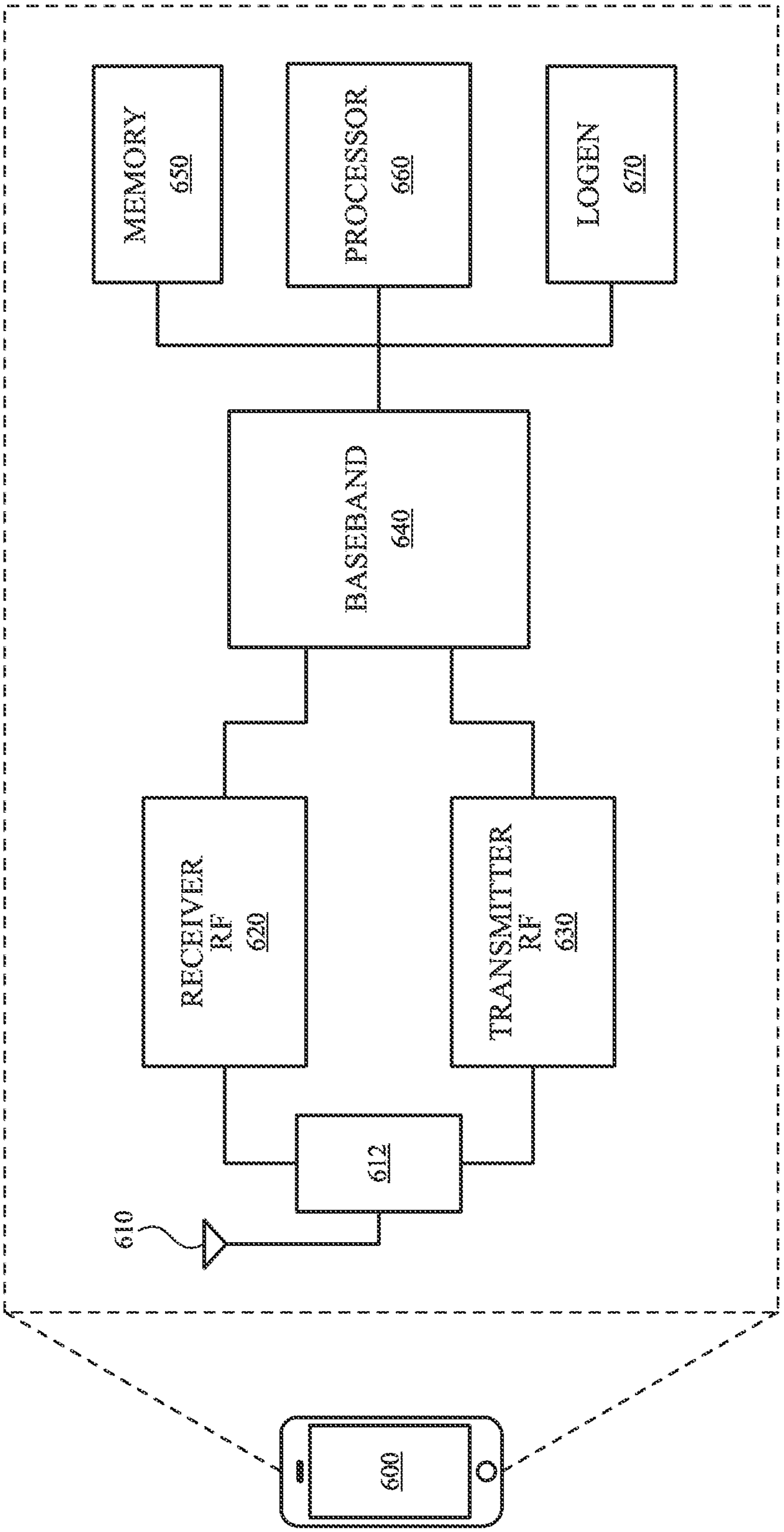
FIG. 6 illustrates a wireless communication device within which some aspects of the subject technology are implemented.

FIG. 6 illustrates a wireless communication device within which some aspects of the subject technology are implemented. In one or more implementations, the wireless communication device 600 can be a tablet, a smartphone or a smartwatch, which may use the two-way integrated speaker system module of the subject technology, as depicted in FIG. 1. The wireless communication device 600 may comprise a radio-frequency (RF) antenna 610, a duplexer 612, a receiver 620, a transmitter 630, a baseband processing module 640, a memory 650, a processor 660 and a local oscillator generator (LOGEN) 670. In various aspects of the subject technology, one or more of the blocks represented in FIG. 6 may be integrated on one or more semiconductor substrates. For example, the blocks 620-870 may be realized in a single chip or a single system on a chip or may be realized in a multichip chipset.

The receiver 620 may comprise suitable logic circuitry and/or code that may be operable to receive and process signals from the RF antenna 610. The receiver 620 may, for example, be operable to amplify and/or downconvert received wireless signals. In various aspects of the subject technology, the receiver 620 may be operable to cancel noise in received signals and may be linear over a wide range of frequencies. In this manner, the receiver 620 may be suitable for receiving signals in accordance with a variety of wireless standards such as Wi-Fi, WiMAX, Bluetooth, and various cellular standards. In various aspects of the subject technology, the receiver 620 may not use any sawtooth acoustic wave (SAW) filters and few or no off-chip discrete components such as large capacitors and inductors.

The transmitter 630 may comprise suitable logic circuitry and/or code that may be operable to process and transmit signals from the RF antenna 610. The transmitter 630 may, for example, be operable to upconvert baseband signals to RF signals and amplify RF signals. In various aspects of the subject technology, the transmitter 630 may be operable to upconvert and amplify baseband signals processed in accordance with a variety of wireless standards. Examples of such standards may include Wi-Fi, WiMAX, Bluetooth, and various cellular standards. In various aspects of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer 612 may be operable in multiple frequency bands of various wireless standards.

The baseband processing module 640 may comprise suitable logic, circuitry, interfaces, and/or code that may be operable to perform the processing of baseband signals. The baseband processing module 640 may, for example, analyze received signals and generate control and/or feedback signals for configuring various components of the wireless communication device 600, such as the receiver 620. The baseband processing module 640 may be operable to encode, decode, transcode, modulate, demodulate, encrypt, decrypt, scramble, descramble, and/or otherwise process data in accordance with one or more wireless standards.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfer of data between various portions of the wireless communication device 600. Additionally, the processor 660 may enable implementation of an operating system or otherwise execute code to manage operations of the wireless communication device 600. In one or more implementations, the processor 660 can be used to perform audio processing and provide audio signals for the two-way integrated speaker system module of the subject technology.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various aspects of the subject technology, information stored in the memory 650 may be utilized for configuring the receiver 620 and/or the baseband processing module 640. In some implementations, the memory 650 may store image information from processed and/or unprocessed fingerprint images of the under-display fingerprint sensor of the subject technology.

The LOGEN 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is designed to receive signals. Wireless signals may be received via the RF antenna 610, amplified, and downconverted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 600, data to be stored to the memory 650, and/or information affecting and/or enabling operation of the wireless communication device 600. The baseband processing module 640 may modulate, encode, and perform other processing on audio, video, and/or control signals to be transmitted by the transmitter 630 in accordance with various wireless standards.

Various functions described above can be implemented in digital electronic circuitry, as well as in computer software, firmware or hardware. The techniques can be implemented by using one or more computer program products. Programmable processors and computers can be included in or packaged as mobile devices. The processes and logic flows can be performed by one or more programmable processors and by one or more programmable logic circuitries. General and special-purpose computing devices and storage devices can be interconnected through communication networks.

Some implementations include electronic components such as microprocessors and storage and memory that store computer program instructions in a machine-readable or computer-readable medium (alternatively referred to as computer-readable storage media, machine-readable media, or machine-readable storage media). Some examples of such computer-readable media include RAM, ROM or flash memory. The computer-readable media can store a computer program that is executable by at least one processing unit and include sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multicore processors that execute software, some implementations are performed by one or more integrated circuits such as application-specific integrated circuits (ASICs) or field-programmable gate arrays (FPGAs). In some implementations, such integrated circuits execute instructions that are stored on the circuit itself.

As used in this specification and any claims of this application, the terms "computer," "processor," and "memory" all refer to electronic or other technological devices. These terms exclude people or groups of people. For the purposes of the specification, the terms "display" or "displaying" mean displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback such as visual feedback, auditory feedback, or tactile feedback. Input from the user can be received in any form, including acoustic, speech, or tactile input.

Many of the above-described features and applications are implemented as software processes that are specified as a set of instructions recorded on a computer-readable storage medium (also referred to as a computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, flash drives, RAM chips, hard drives and EPROMs. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as subparts of a larger program while remaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language including compiled or interpreted languages and declarative or procedural languages, and it can be deployed in any form including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects, and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations, and vice versa.

The word "example" is used herein to mean "serving as an example or illustration." Any aspect or design described herein as an "example" is not necessarily to be construed as preferred or advantageous over other aspects or designs.

As described above, one aspect of a communication device within which the present technology may be implemented is the gathering and use of data available from various sources to detect and track the performance of a physical activity event. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for," or, in the case of a method claim, the element is recited using the phrase "step for." Furthermore, to the extent that the terms "include," "have," or the like are used in the description or the claims, such terms are intended to be inclusive in a manner similar to the term "comprise," as "comprise" is interpreted when employed as a transitional word in a claim.

What is claimed is:

1. A device comprising:

a speaker comprising:

a diaphragm configured to generate sound in a first frequency range; and a piezoelectric transducer formed on or bonded to the diaphragm and configured to generate sound in a second frequency range different from the first frequency range.

2. The device of claim 1, wherein the diaphragm comprises a metal diaphragm, and wherein the metal diaphragm is made of aluminum.

3. The device of claim 1, wherein the piezoelectric transducer comprises a piezoelectric disk made of a lead-zirconium-titanium oxide thin film, and wherein the piezoelectric disk is bonded to the diaphragm.

4. The device of claim 3, wherein a thickness of the piezoelectric disk is within a range of about 50-150 μm, and wherein the piezoelectric disk is formed on the diaphragm.

5. The device of claim 1, wherein an area of the piezoelectric transducer is smaller than an area of the diaphragm.

6. The device of claim 1, wherein the piezoelectric transducer comprises a piezoelectric ring made of a lead-zirconium-titanium oxide thin film, and wherein the piezoelectric ring is bonded to the diaphragm.

7. The device of claim 6, wherein a thickness of the piezoelectric ring is within a range of about 50-150 um, and wherein the piezoelectric ring is formed on the diaphragm.

8. The device of claim 1, wherein the speaker further comprises a voice coil that is configured to receive, from an audio-signal source, a first signal for causing generation of the sound in the first frequency range.

9. The device of claim 8, wherein the piezoelectric transducer is configured to receive, from the audio-signal source via conductive traces on the diaphragm, a second signal for causing generation of the sound in the second frequency range.

10. The device of claim 9, wherein the voice coil is configured to move within a cavity of a magnet, and wherein the device further comprises a secondary coil magnetically coupled to the voice coil.

11. The device of claim 10, wherein the magnet and the voice coil are assembled within a housing of the device, wherein terminals of the secondary coil are coupled to a substrate and a plating layer, and wherein the piezoelectric transducer is sandwiched between the substrate and the plating layer.

12. A method comprising:

coupling a diaphragm to a voice coil to create audio waves in a first frequency range in response to the voice coil receiving a first audio signal; and coupling a piezoelectric transducer to the diaphragm to create audio waves in a second frequency range different from the first frequency range in response to the piezoelectric transducer receiving a second audio signal, wherein coupling the piezoelectric transducer to the diaphragm comprises one of forming the piezoelectric transducer on the diaphragm or bonding the piezoelectric transducer to the diaphragm.

13. The method of claim 12, wherein coupling the piezoelectric transducer to the diaphragm comprises coupling a piezoelectric disk or ring made of a lead-zirconium-titanium oxide thin film to the diaphragm made of a metal, wherein the metal comprises aluminum.

14. The method of claim 12, wherein coupling the piezoelectric transducer to the diaphragm comprises bonding the piezoelectric transducer to the diaphragm.

15. The method of claim 12, further comprising:

assembling the voice coil along with a secondary coil and a magnet within a housing of a device, and stacking the piezoelectric transducer between a plating layer and a substrate, and coupling terminals of the secondary coil to the plating layer and the substrate.

16. The method of claim 12, further comprising configuring the piezoelectric transducer to receive the second audio signal from an audio-signal source via conductive traces formed on the diaphragm.

17. A speaker comprising:

a primary coil;

a diaphragm configured to generate sound in a first frequency range; and a piezoelectric transducer formed on or bonded to the diaphragm and configured to generate sound in a second frequency range different from the first frequency range.

18. The speaker of claim 17, wherein the piezoelectric transducer comprises one of a piezoelectric disk or a piezoelectric ring made of a lead-zirconium-titanium oxide thin film.

19. The speaker of claim 17, wherein the piezoelectric transducer is sandwiched between a plating layer and a substrate.

20. The speaker of claim 19, further comprising a secondary coil magnetically coupled to the primary coil, wherein terminals of the secondary coil are coupled to the plating layer and the substrate.

* * * * *